United States Patent [19]

Watanabe et al.

[11] Patent Number: 5,069,524

[45] Date of Patent: Dec. 3, 1991

[54] ROBOT HAND OPTICAL FIBER CONNECTOR COUPLING ASSEMBLY

[75] Inventors: Shinpei Watanabe; Yasuto Watanabe; Yuzi Ikeda; Keiichiro Gunji; Ryo Niikawa, all of Sayama, Japan

[73] Assignee: Honda Giken Kogyo Kabushiki Kaisha, Tokyo, Japan

[21] Appl. No.: 573,864

[22] Filed: Aug. 28, 1990

Related U.S. Application Data

[62] Division of Ser. No. 165,029, Mar. 7, 1988, Pat. No. 4,990,022.

[51] Int. Cl.$^5$ .................... G02B 6/38; H01J 5/16; B25J 19/00
[52] U.S. Cl. .................... 385/59; 250/227.11; 901/28; 901/47; 385/89
[58] Field of Search ............. 350/96.10, 96.15, 96.16, 350/96.20, 96.21, 96.22, 96.23, 96.24; 250/227.11; 901/27, 28, 46, 47

[56] References Cited

U.S. PATENT DOCUMENTS

| | | | |
|---|---|---|---|
| 4,040,650 | 8/1977 | Shotbolt | 285/18 |
| 4,330,140 | 5/1982 | Hampton | 285/39 |
| 4,453,085 | 6/1984 | Pryor | 901/47 X |
| 4,460,826 | 7/1984 | Pryor | 350/96.25 |
| 4,570,065 | 2/1986 | Pryor | 901/47 X |
| 4,636,135 | 1/1987 | Bancon | 414/736 |
| 4,664,588 | 5/1987 | Newell et al. | 414/730 |
| 4,668,119 | 5/1987 | Galletti | 403/349 |
| 4,720,130 | 1/1988 | Andou | 294/64.1 |
| 4,756,638 | 7/1988 | Neyret | 403/261 |
| 4,767,257 | 8/1988 | Kato | 350/96.21 |
| 4,818,174 | 4/1989 | Arpiarian et al. | 414/735 |
| 4,990,022 | 2/1991 | Watanabe et al. | 403/349 |

FOREIGN PATENT DOCUMENTS

59-156692 9/1984 Japan .................. 414/730 X

Primary Examiner—Brian Healy

[57] ABSTRACT

A robot hand changer has a first joint member mounted on a robot arm, a second joint member mounted on a robot hand, and an engaging member mounted on the first joint member and angularly movable with respect to the second joint member for coupling the first and second joint members against each other. The robot hand changer also has an optical signal transmission device including sets of optical fibers disposed in confronting relation out of contact with each other for transmitting control signals across mating surfaces when the robot arm and the robot hand are coupled to each other, and photoelectric transducer circuits for converting electric signals to optical signals and vice versa. The robot hand arm further includes a detecting device for detecting dirt on the mating surfaces.

9 Claims, 9 Drawing Sheets

ROBOT HAND OPTICAL FIBER CONNECTOR COUPLING ASSEMBLY

This application is a divisional of copending application Ser. No. 07/165,029, filed on Mar. 7, 1988, now U.S. Pat. No. 4,990,022.

BACKGROUND OF THE INVENTION

The present invention relates to a robot hand changer, and more particularly to a robot hand changer for automatically attaching a hand for gripping a workpiece or effecting other operations, detachably to a robot, and for reliably and accurately mounting a hand to a robot even if the hand is relatively heavy, the device being capable of easily transmitting control signals and the like between the robot and the hand and being highly reliable in sufficiently withstanding frequent connection and disconnection between the robot and the hand.

In recent years, factories have seen widespread use of robots for automatically machining, conveying, and assembling workpieces to mass-produce products efficiently. The robots are generally designed to effect single operation. Since however many factories produce a wide variety of different products, there has been a demand for a multifunction robot which can perform different kinds of operation.

To meet such a demand, there has been proposed a robot hand changer for selectively attaching hands for machining, conveying, assembling workpieces detachably to a robot, so that the single robot can perform many types of operation with the use of desired hands.

A robot hand for gripping a passenger seat to install the same in an automobile body is relatively large and heavy. Since such a robot hand imposes a considerable load on a joint to a robot body, it is practically impossible to rely on a robot hand changer for use with the robot hand. Therefore, a robot hand changer has heretofore been employed to change relatively light hands, and hence a robot finds limited functions.

Lead wires, optical fibers, and pipes for supplying mediums to actuate a hand or a tool are exposed, and hence are susceptible to damage under external forces during operation of the robot.

The robot body and the hand are required to be not only mechanically coupled to each other, but also have an easily detachable construction which can supply electric power, transmit control signals, and deliver a hydraulic or pneumatic fluid for actuating the hand, between the robot body and the hand.

The control signals to be transmitted between the robot body and the hand is fed through many electric cables which are coupled by a connector. Where the hand is replaced with others at frequent intervals, the durability of the connector may be reduced by frequent connection and disconnection thereof. Recently, efforts have been made to eliminate the mechanical connection in signal transmission by employing a magnetic connector in place of the mechanical connector or an optical connector through which optical signals converted from electric signals are transmitted. In case magnetic sensors are used in the connector, they are subject to disturbance arising from an external magnetic field and take up a large space since as many magnetic sensors are disposed as the number of electric cables used. Where optical control signals are transmitted through a single optical fiber, parallel control signals corresponding to the electric cables are converted to serial signals for transmission and the serial signals which are received are converted back to parallel signals. Converters required for such parallel-to-serial and serial-to-parallel signal conversion make the entire system complex and costly.

SUMMARY OF THE INVENTION

It is a general object of the present invention to provide a robot hand changer which can easily and reliably mount a hand that is relatively large and heavy on an arm of a robot.

A major object of the present invention is to provide a robot hand changer by which pipes for supplying a medium to actuate a robot hand or a tool, and signal wires for electric control can quickly and reliably be connected between the robot hand and a robot arm without being exposed, so that no malfuction or failure will be experienced and high durability will be ensured for the pipes and the signal wires.

Another object of the present invention is to provide a robot hand changer in which a first joint member is mounted on a robot arm, a second joint member is mounted on a robot hand, and engaging means is mounted on one of the first and second joint members and angularly movable with respect to the other joint member for pressing the first and second joint members against each other, and lead wires, optical fibers, there being pipes for supplying hand actuating mediums, the lead wires. The optical fibers, and the pipes are not exposed. The robot hand changer is capable of mounting the robot hand, even if it is relatively heavy, firmly and accurately on the robot arm. The robot hand changer of the present invention is highly versatile.

Still another object of the present invention is to provide a robot hand changer having an optical signal transmission device including sets of optical signal transmitting means such as optical fibers disposed in confronting relation out of contact with each other for transmitting control signals across mating surfaces when the robot arm and the robot hand are coupled to each other. The robot hand changer also includes photoelectric transducer circuits, so that the control signals can be transmitted without using mechanical coupling means, and the robot hand can easily be detached and attached even if hand replacement is highly frequent, the optical signal transmission device being highly durable and reliable.

Yet still another object of the present is to provide a robot hand changer having optical signal transmitting means capable of detecting dirt on mating surface of a robot hand and a robot arm.

A further object of the present invention is to provide a robot hand changer comprising a first joint member adapted to be mounted on a robot arm, a second joint member adapted to be mounted on a robot hand, means for supplying a hand actuating medium through said first and second joint members to the robot hand, actuator means, and engaging means mounted on one of said first and second joint members and angularly movable by said actuator means for detachably coupling said first and second joint members.

A still further object of the present invention is to provide a robot hand changer comprising a first joint member adapted to be mounted on a robot arm, a second joint member adapted to be mounted on a robot hand, said first and second joint members being coupled to detachably connect said robot hand to said robot arm, at least one set of optical signal transmitting means mounted in said first and second joint members in confronting relation out of contact with each other for transmitting control signals across mating surfaces of said robot hand and said robot arm, and photoelectric transducer circuits adapted to be disposed in said robot hand and said robot arm, respectively, for converting an optical signal received via said optical signal transmitting means to electric signals and/or converting an optical signal transmitted via said optical signal transmitting means from electric signals.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
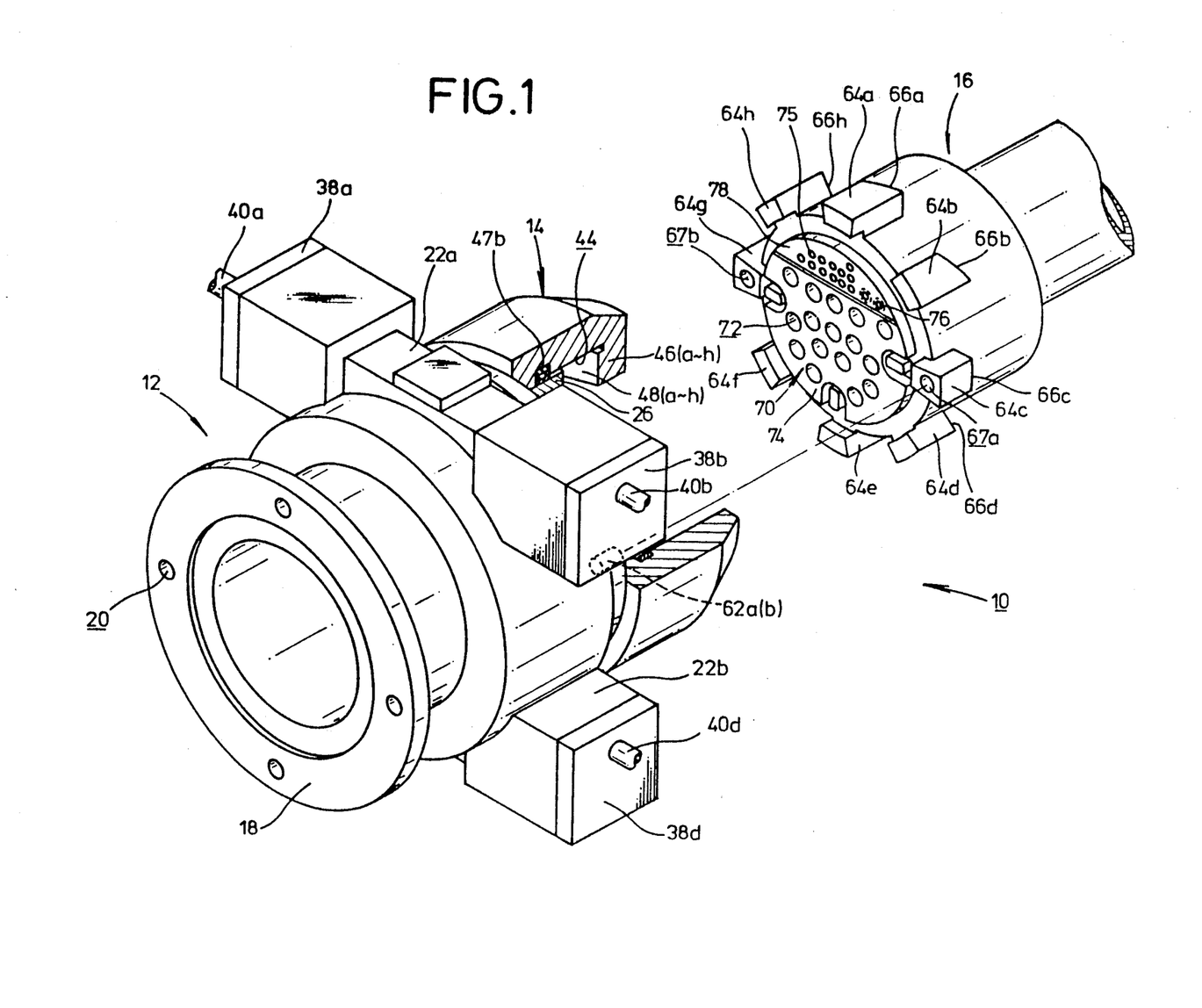
FIG. 1 is an exploded perspective view, partly cut away, of a robot hand changer according to the present invention, showing the robot hand changer as being separated.
Figure 2:
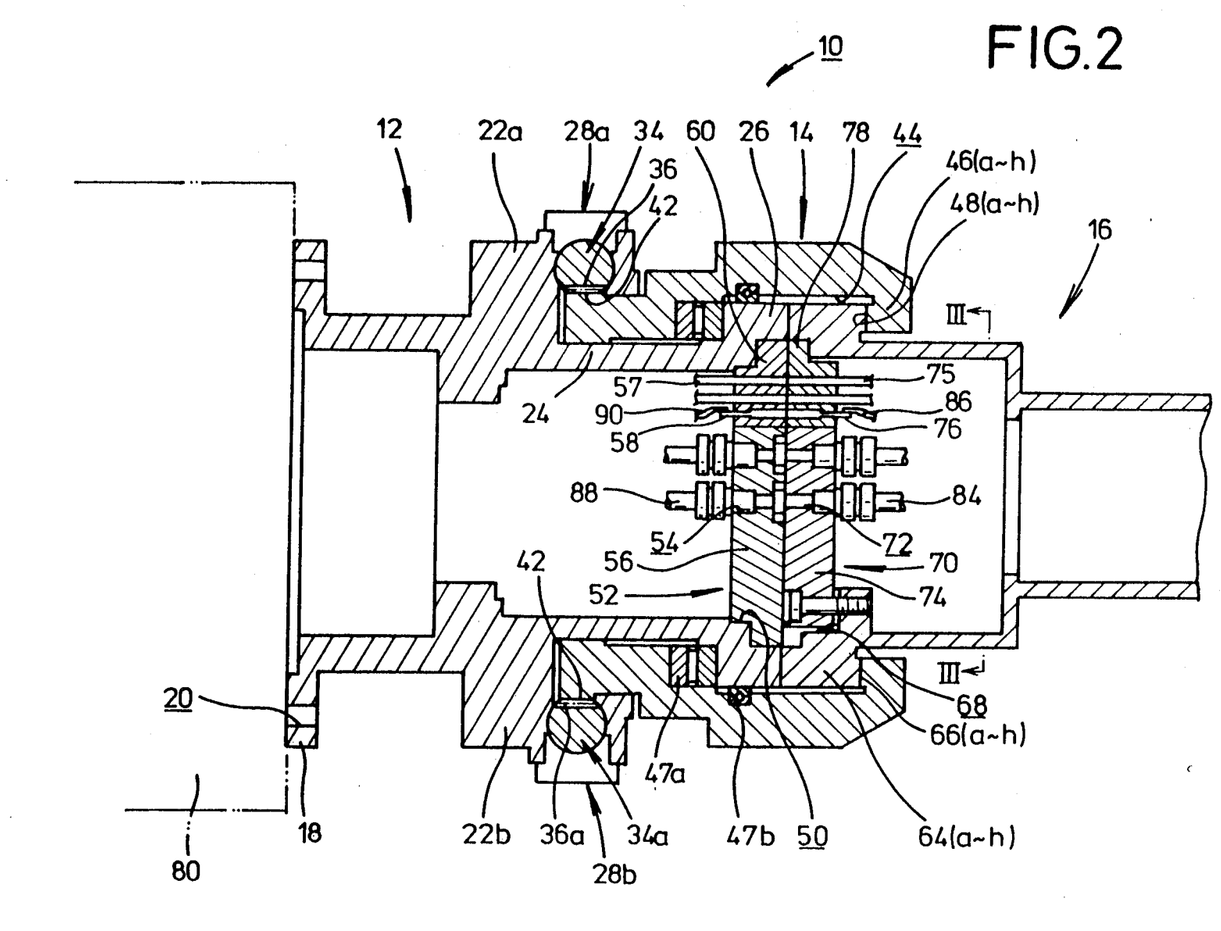
FIG. 2 is a fragmentary cross-sectional view of the robot hand changer shown as being coupled.

As shown in FIGS. 1 and 2, a robot hand changer according to the present invention includes a main changer assembly 10 comprising a first joint member 12 to be mounted on a robot body, an engaging member 14 rotatably fitted over the first joint member 12, and a second joint member 16 mounted on a hand and coupled to the first joint member 12 through the engaging member 14.

The first joint member 12 is of a substantially cylindrical shape including a flange 18 on one axial end thereof, the flange 18 having a plurality of bolt insertion holes 20 extending in the axial direction thereof. The first joint member 12 has a pair of parallel casings 22a, 22b extending radially outwardly in a direction normal to the axial direction of the first joint member 12. A cylindrical member 24 extends axially from an end of the casings 22a, 22b and includes a larger-diameter portion 26 on its end (see FIG. 2). Cylinder mechanisms 28a, 28b are mounted on the casings 22a, 22b, respectively.

Figure 3:
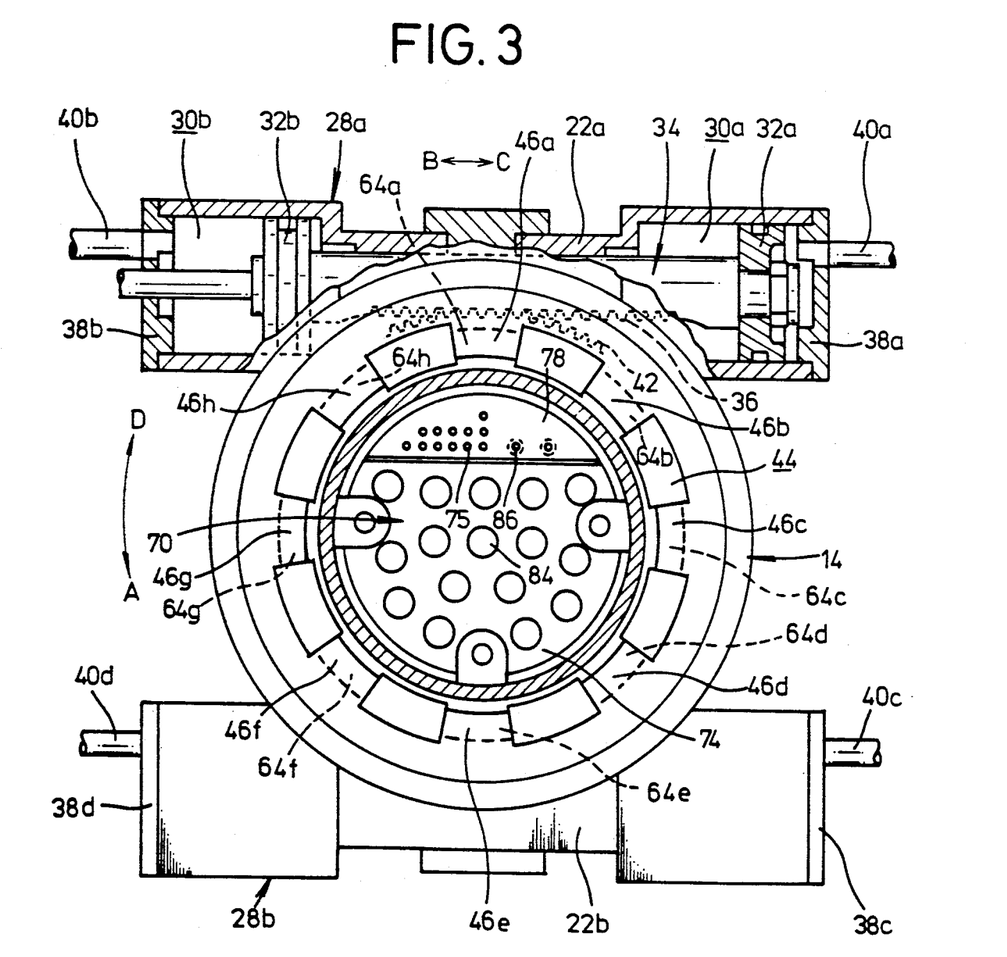
FIG. 3 is a cross-sectional view taken along line III—III of FIG. 2.

As illustrated in FIG. 3, the casing 22a has chambers 30a, 30b defined in its opposite end portions, respectively, with pistons 32a, 32b being axially slidably fitted respectively in the chambers 30a, 30b. The pistons 32a, 32b are fixedly mounted on the opposite ends of a rod 34 having an axially extending rack 36 on an outer peripheral surface thereof. The chambers 30a, 30b are closed by respective covers 38a, 38b fixed to the opposite ends of the casing 22a. To the covers 38a, 38b, there are coupled ends of fluid pipes 40a, 40b, respectively, the other ends of which are connected to a fluid pressure source (not shown).

Likewise, a rod 34a having a rack 36a is displaceably fitted in the casing 22b (see FIG. 2). The casing 22b has its opposite ends closed by respective covers 38c, 38d fixed thereto to which respective fluid pipes 40c, 40d are connected. The racks 36, 36a of the rods 34, 34a are held in mesh with the engaging member 14.

Figure 4:
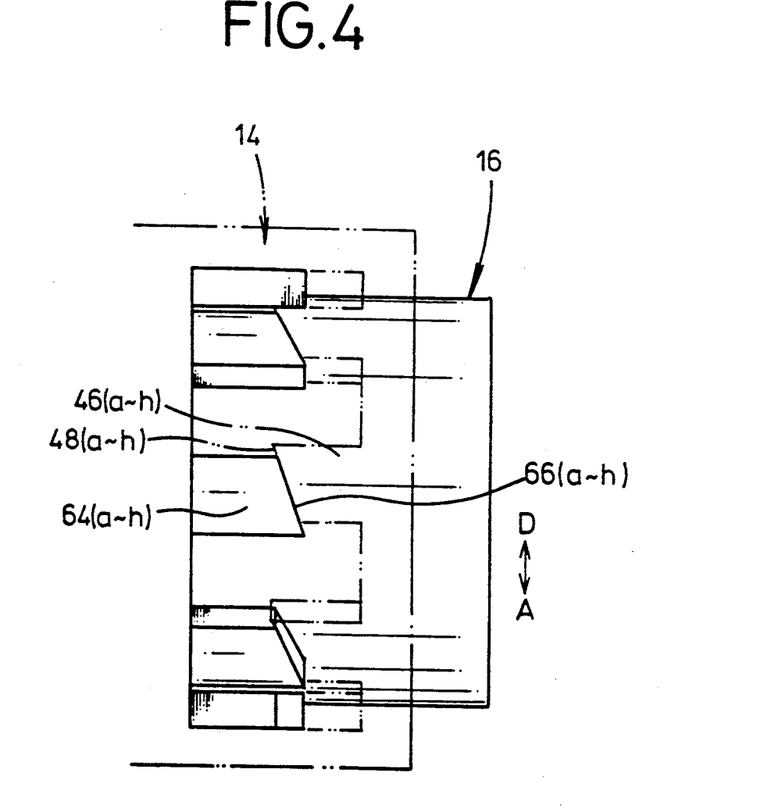
FIG. 4 is an elevational view illustrating coupling operation of the robot hand changer.

The engaging member 14 is of a cylindrical shape having a pinion 42 on its outer periphery at one end thereof, the pinion 42 meshing with the racks 36, 36a (FIG. 3). The engaging member 14 has a stepped hole 44 defined centrally therein and includes a plurality of radially inwardly projecting teeth 46a through 46h in a larger-diameter portion of the stepped hole 44. The teeth 46a through 46h are circumferentially equally spaced and have respective inner engaging surfaces 48a through 48h (see FIG. 4) tapered or slanted axially toward adjacent teeth in the direction of the arrow A in which the engaging member 14 is tightened. The engaging member 14 is rotatably fitted over the first joint member 12 by means of bearings 47a, 47b on the cylinderical portion 24 and the larger-diameter portion 26 of the first joint member 12, with the pinion 42 meshing with the racks 36, 36a.

A stepped hole 50 is defined centrally in the larger-diameter portion 26 of the first joint member 12, with a disc 52 being fixedly fitted in the stepped hole 50. The disc 52 comprises, as an integral structure, a manifold 56 having a plurality of fluid ports 54 and a holder plate 60 supporting a plurality of optical fibers 47 and connector terminals 58. Positioning pins 62a, 62b (FIG. 1) are threaded in the front face of the larger-diameter portion 26 of the first joint member 12.

The second cylindrical joint member 16 has a plurality of equally circumferentially spaced teeth 64a through 64h projecting radially outwardly from an outer circumferential surface of the second joint member 46 at one end thereof, the teeth 64a through 64h being positioned for engagement with the teeth 46a through 46h, respectively, of the engaging member 14. The teeth 46a through 46h have engaging surfaces 66a through 66h, respectively, tapered or slanted complementarily to the slanted surfaces 48a through 48h of the teeth 46a through 46h. The outer peripheral surfaces of the teeth 64a through 64h jointly define an imaginary circle the diameter of which is smaller than the diameter of the larger-diameter portion of the stepped hole 44 in the engaging member 14. The teeth 64c, 64g have holes 67a, 67b defined therein in the axial direction of the second joint member 16. The positioning pins 62a, 62b of the first joint member 12 are fitted respectively in the holes 67a, 67b for positioning the first and second joint members 12, 16 with respect to each other.

A disc 70 is fixedly mounted in a stepped hole 68 defined centrally in the second joint member 16. The disc 70 comprises, as an integral structure, a manifold 74 having a plurality of fluid ports 72 and a holder plate 78 supporting a plurality of optical fibers 75 and connector terminals 76. When the first and second joint members 12, 16 are joined to each other, the discs 70, 52 are held against each other to provide communication between the fluid ports 72, 54 and connection between the connector terminals 76, 58.

The first joint member 12 is mounted on an robot arm 80 (FIG. 2) by bolts or the like passing through the holes 20 in the flange 18. The second joint member 16 is mounted on a hand 82 (FIG. 5) for gripping an automobile passenger seat, for example. Therefore, the manifold 74 and the holder plate 78 which are fixed to the second joint member 16 are coupled to fluid pipes 84, optical fibers 75, and lead wires 86 that are necessary for actuating the seat gripping hand 82. The manifold 56 and the support plate 60 fixed to the first joint 12 are connected to fluid pipes 88, optical fibers 57, and lead wires 90, the number of which is at least equal to the number of the fluid pipes 84, optical fibers 75, and lead wires 86. The fluid pipes 88, the optical fibers 57, and the lead wires 90 are housed in the first joint member 12 and coupled to the robot body (not shown) through the robot arm 80.

Mechanical operation of the robot hand changer thus constructed for mounting the seat gripping hand 82 on the robot arm 80, for example, will be described hereinbelow.

As shown in FIG. 1, the first and second joint members 12, 16 are positioned in axially confronting relation and displaced toward each other. The teeth 46a through 46h of the engaging member 14 are initially in an angular position different from the angular position of the teeth 64a through 64h of the second joint member 16. Therefore, the second joint member 16 is loosely fitted into the stepped hole 44. The positioning pins 62a, 62b threaded in the first joint member 12 are fitted respectively into the holes 67a, 67b of the second joint member 16 to position the first and second joint members 12, 16 relatively to each other. The discs 52, 70 are brought into abutment against each other to connect the manifolds 56, 74 and the holder plates 60, 78. Therefore, the pipes 84, 88 are coupled to each other, the optical fibers 57, 75 are optically connected to each other, and the lead wires 86, 90 are electrically connected to each other.

Then, as shown in FIG. 3, the cylinder mechanisms 28a, 28b are actuated. More specifically, the cylinder mechanism 28a on the casing 22a operates as follows: A fluid is supplied from the pipe 40a into the chamber 30a in the casing 22a to push the piston 32a in the direction of the arrow B for thereby displacing the rod 34 coupled to the piston 32a in the direction of the arrow B. Consequently, the pinion 42 meshing with the rack 36 on the rod 34 is rotated about its own axis in the direction of the arrow A, and so is the engaging member 14 having the pinion 42. The teeth 46a through 46h are angularly displaced with the engaging member 14 in the direction of the arrow A to bring the engaging surfaces 48a through 48h of the teeth 46a through 46h into contact with the engaging surfaces 66a through 66h of the teeth 64a through 64h. The engaging surfaces 48a through 48h are slanted toward the second joint member 16 in the direction in which the engaging member 14 is tightened (in the direction of the arrow A), and the engaging surfaces 66a through 66h are slanted complementarily to the engaging surfaces 48a through 48h (see FIG. 4). Continued rotation of the engaging member 14 in the direction of the arrow A thus press the engaging surfaces 48a through 48h and the engaging surfaces 66a through 66h firmly against each other through a wedging action. At this time, the cylinder mechanism 28b on the casing 22b is similarly operated by supplying a fluid from the pipe 40d into the casing 22a to displace the rod 34a in the direction of the arrow C. The pinion 42 meshing with the rack 46a of the rod 34a is thus rotated in the direction of the arrow A by the displacement of the rod 34a. As a result, pinion 42 is rotated by the combined movement of the rods 34, 34a to couple the first and second joint members 12, 16 firmly to each other.

Figure 5:
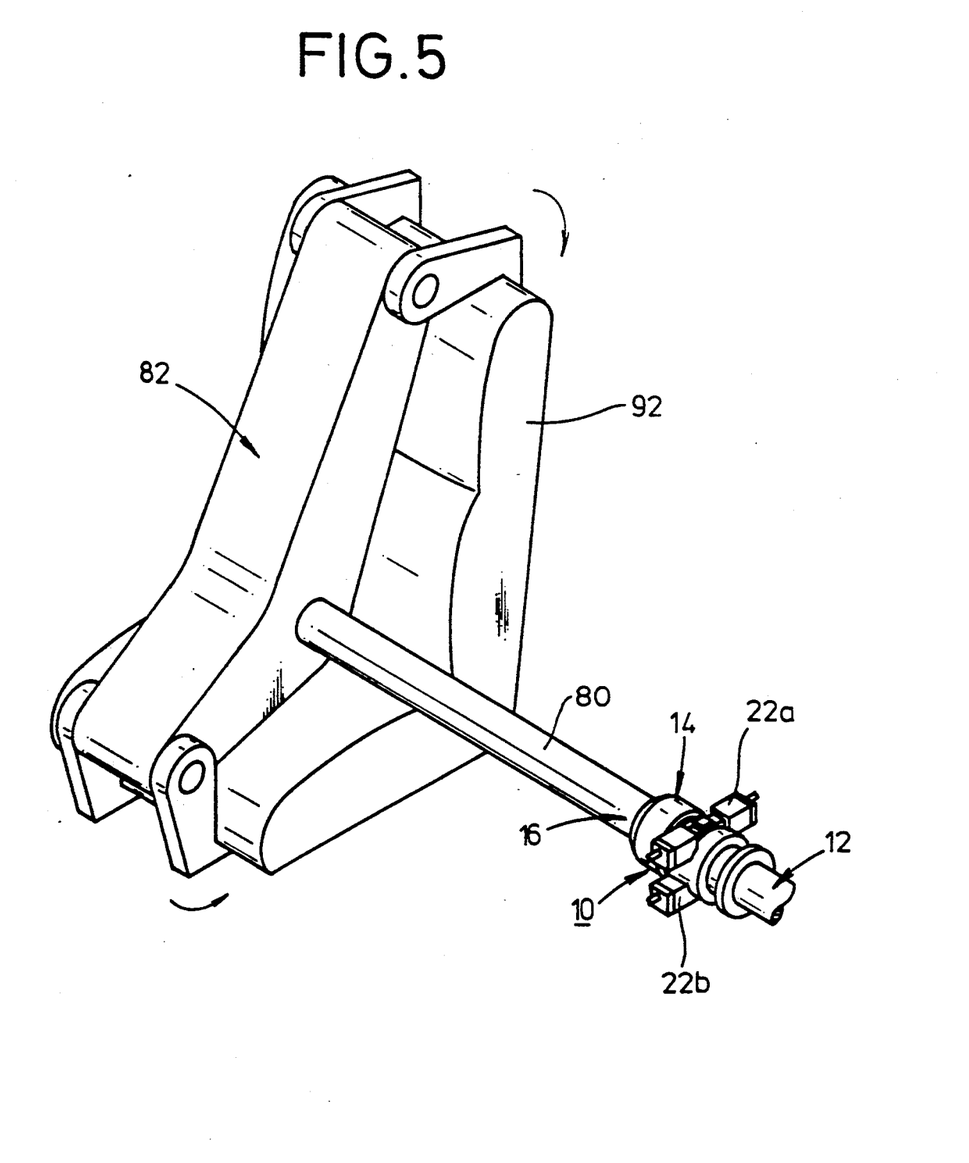
FIG. 5 is a perspective view of a sheet gripping hand mounted on a robot by the robot hand changer.

After the seat gripping hand 82 is mounted on the robot arm 80, oil or air under pressure is supplied from the pipes 88 to the pipes 84 to drive cylinders or the like of the seat gripping hand 82. Optical signals are supplied from the optical fibers 57 to the optical fibers 75, and electric signals are fed from the lead wires 90 to the lead wires 86 to energize motors or the like of the seat gripping hand 82, for thereby enabling the seat gripping hand 82 to grip the seat 92, as shown in FIG. 5.

The robot hand changer of the present invention can mount the seat gripping hand 82 which is relatively large and heavy on the robot arm 80. More specifically, the first and second joint members 12, 16 are coupled firmly to each other by the teeth 64a through 64h of the second joint member 16 and the teeth 46a through 46h of the engaging member 14 which is rotatably fitted over the first joint member 12. Since the teeth 64a through 64h and 46a through 46h have the slanted engaging surfaces 66a through 66h and 48a through 48h, respectively, the load of the seat gripping hand 82 is not imposed locally on the main changer assembly 10. The first and second joint members 12, 16 are firmly anchored to each other because the engaging surfaces 48a through 48h and 66a through 66h are held in engagement with each other through a wedging action. Therefore, the large and heavy seat gripping hand 82, which has heretofore been unable to be used with a robot hand changer, can reliably and accurately be mounted on the robot arm 80. The first and second joint members 12, 16 can be securely coupled to each other because the engaging member 14 is turned by the two cylinder mechanisms 28a, 28b through their combined movement.

In the robot hand changer according to the embodiment of the present invention, the pipes 84, the optical fibers 75, and the lead wires 86 for actuating the seat gripping hand 82 are not exposed out. More specifically, when the first and second joint members 12, 16 are joined to each other, the discs 52, 70 are held against each other to couple the manifolds 56, 74, connect the optical fibers 57, 75 optically, and connect the connector terminals 58, 76 electrically. With as many pipes 88, optical fibers 57, and lead wires 90 being supported by the disc 52 in the first joint member 12 as the number of the pipes 84, optical fibers 75, and lead wires 86, an operating medium, control signals, and electric power can easily be supplied to the seat gripping hand 82. As a consequence, the pipes, the optical fibers, and the lead wires are free from damage or breakage which would otherwise be caused if they were exposed as is the case with the conventional arrangements.

The seat gripping hand 82 can be detached from the robot arm 80 as follows:

While the second joint member 16 is being placed on a hand rest or the like, a fluid is supplied under pressure from the pipes 40b, 40c into the casings 22a, 22b. The fluid supplied under pressure into the chamber 30b in the casing 22a pushes the piston 32b in the direction of the arrow C, so that the rod 34 coupled to the piston 32b is displaced in the direction of the arrow C to enable the rack 36 to rotate the pinion 42 in the direction of the arrow D. The fluid supplied under pressure from the pipe 40d displaces the rod 34a in the direction of the arrow B, thus rotating the pinion 42 meshing with the rack 36a in the direction of the arrow D. Therefore, the engaging member 14 having the pinion 42 is rotated in the direction of the arrow D to cause the teeth 46a through 46h to move out of contact with the teeth 64a through 64h for thereby releasing the engaging surfaces 48a through 48h and 66a through 66h from wedging engagement. When the teeth 46a through 46h and 64a through 64h are brought into different angular positions, the cylinder mechanisms 28a, 28b are inactivated, and the first and second joint members 12, 16 are relatively displaced away from each other until the second joint member 16 is moved out of the stepped hole 44. As a result, the robot arm 80 and the seat gripping hand 82 are separated from each other. Another desired hand may then be mounted on the robot arm 80 in the same manner as described above for effecting a next operation.

An optical signal transmission device used with the robot hand changer for transmitting control signals through optical fibers will be described below.

Figure 6:
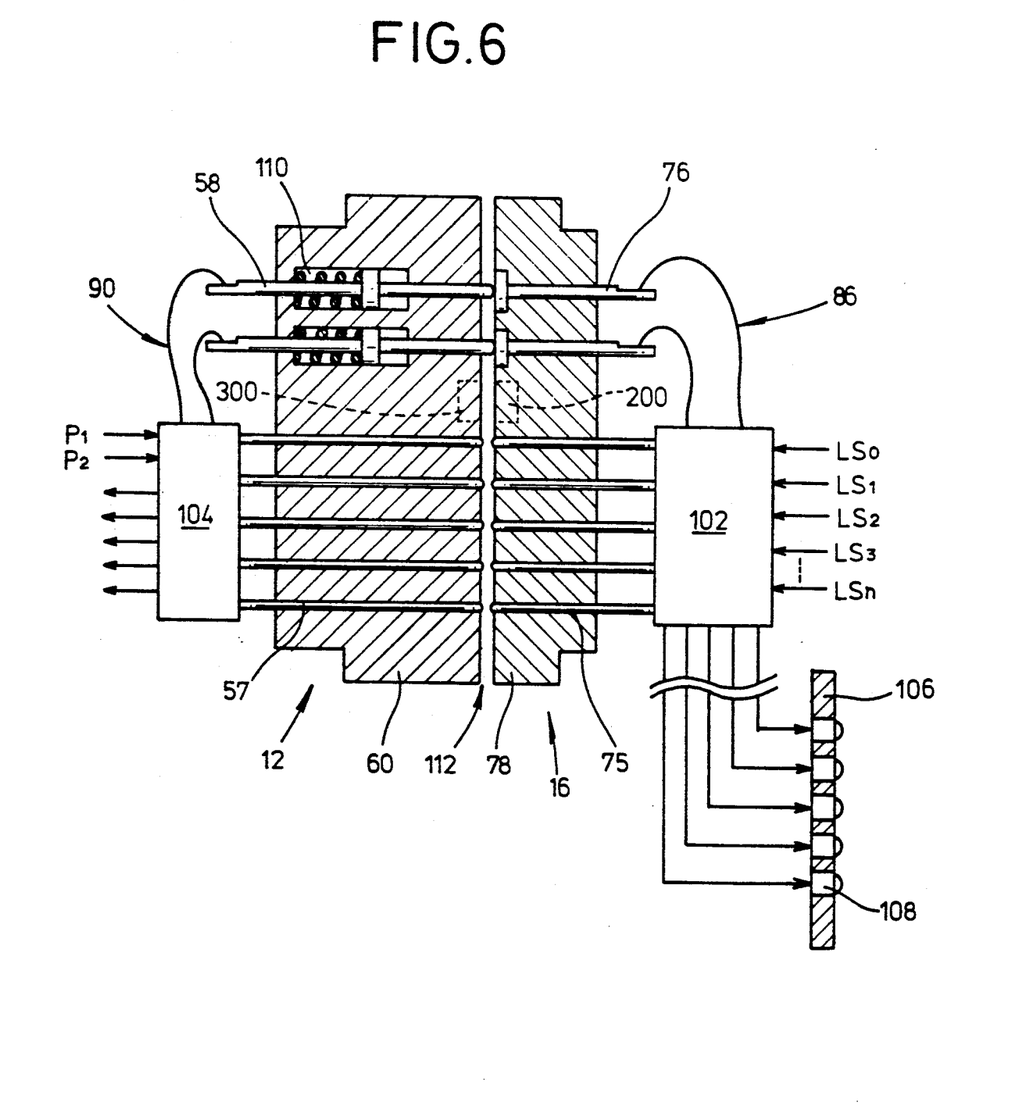
FIG. 6 is a view, partly in cross section, of an optical signal transmission device.

As shown in FIG. 6, the holder plate 60 supports the connector terminals 58 for a power supply and the optical fibers 57, and is disposed in the first joint member 12 connected to the robot body. Similarly, the holder plate 78 supports the connector terminals 76 for a power supply and the optical fibers 75, and is disposed in the second joint member 12 connected to the robot hand. A photoelectric converter circuit 102 disposed in the robot hand serves to convert control signals LS1 through LSn (electric signals) indicative of operating conditions of various parts of the robot hand to optical signals through light-emitting elements or the like, and to apply the optical signals to the optical fibers 75. A photoelectric transducer circuit 104 disposed in the robot body serves to convert the optical signals received from the optical fibers 57 to electric signals through photocouplers or the like. An indicator panel 106 indicates the status of the control signals LS1 through LSn with light-emitting elements 108. Electric power is supplied from the power supply via power supply lines P1, P2, lead wires 90, and the connector terminals 58, 76 to lead wires 86. Coil springs 110 acting on the connector terminals 58 are effective to press the connector terminals 58 against the connector terminals 76 when the robot body and the robot hand are joined to each other. The optical fibers 57 and the optical fibers 75 are held by the holder plates 60, 78, respectively, so that the optical fibers 57, 75 will be positioned in face-to-face relation when the robot body and the robot hand are coupled to each other.

The optical signal transmission device operates and offers advantages as follows:

As described above with reference to FIGS. 1 through 4, when the robot arm 80 and the seat gripping hand 82 are coupled to each other by the first and second joint members 12, 16, the electric power is supplied from the robot body to the robot hand through the connector terminals 58, 76. The electric signals LS1 through LSn representative of the operating conditions of the components of the robot hand are converted to optical signals by the photoelectric transducer circuit 102, and the optical signals are led by the optical fibers 75 to mating surfaces 112 of the holder plates 60, 78. The mating surfaces 112 are slightly spaced from each other when the first and second joint members 12, 16 are coupled. The optical signals from the optical fibers 75 are transmitted to the confronting optical fibers 57, and their status is indicated on the display panel 106 by the light-emitting elements 108 mounted thereon.

The optical signals transmitted to the optical fibers 57 are converted back to electric signals by the photoelectric transducer circuit 104, and the electric signals are then transmitted to a sequence control unit in the robot body for controlling movement of the robot hand.

The electric signals are converted to corresponding optical signals in two states represented by energization and de-energization of the light-emitting elements in the photoelectric transducer circuit 102. Therefore, even if the optical fibers 75, 57 are positioned somewhat out of axial alignment with each other, the signals can be transmitted therebetween unless a large transmission loss were caused by substantial axial misalignment between the optical fibers 75, 57. To avoid such transmission loss, it is preferable that the joint members 12, 16 and the holder plates 60, 78 be of high mechanical accuracy so that the optical fibers 75, 57 will face each other in each pair at the mating surfaces 112 with high accuracy.

When the first and second joint members 12, 16 are interconnected, the optical fibers 75, 57 are out of contact with each other since the mating surfaces 112 are slightly spaced from each other. Even if robot hands are changed highly frequently, therefore, the optical fibers 5, 57 will not be damaged at their confronting ends as they do not engage each other, and hence the optical fibers 75, 57 have increased durability and reliability.

Figure 7:
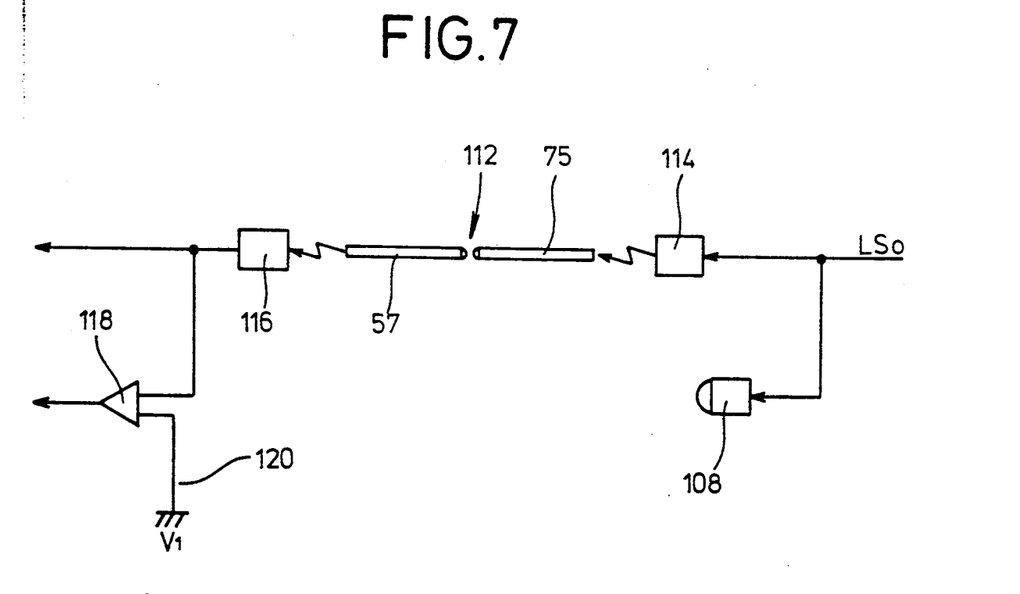
FIG. 7 is a diagram showing a means for detecting dirt on mating surfaces.

FIG. 7 shows a detecting means for detecting dirt on the mating surfaces of the robot arm and the robot hand, in the signal transmission means illustrated in FIG. 6. Since robots that can be used in combination with the present invention are employed in factories, the joint between the robot arm and the robot hand tends to be smeared with oil and dust deposits. If the end faces of the optical fibers in the signal transmission means of the invention for transmitting optical control signals were smeared with oil and/or dirt, the transmission loss would be increased, a condition which is not preferable.

Figure 8:
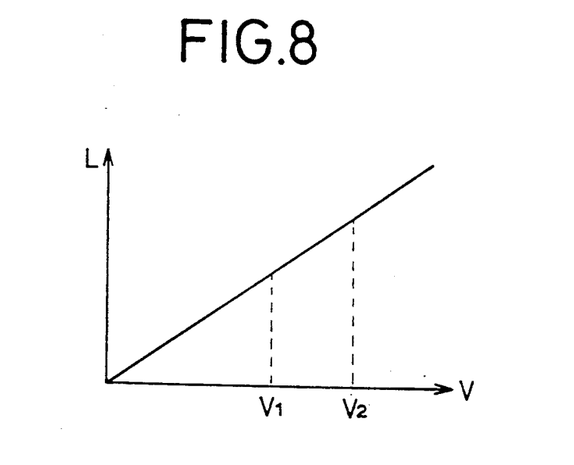
FIG. 8 is a diagram showing characteristics of a photoelectric transducer device.

The detecting means shown in FIG. 7 is designed to solve the above problem. One of the signals LS indicative of the operating conditions of the parts of the robot hand, e.g., a signal LS0, is used. This signal is applied to energize a light-emitting element 114 in the photoelectric transducer circuit 102 at all times while the robot arm and the robot hand are being coupled to each other, for thereby transmitting an optical signal into the optical fiber 75. The optical signal passes from the optical fiber 75 across the mating surfaces 112 into the optical fiber 57, from which the optical signal is fed to the photoelectric transducer circuit 104 in which the optical signal is converted to an electric signal by a photocoupler 116. The level L of light represented by the optical signal transmitted through the optical fibers 75, 57 is related to the output voltage level V of the photoelectric transducer element such as the photocoupler as shown in FIG. 8. That is, as the light level L increases, the output voltage goes higher at a proportional rate. The output from the photocoupler 116 is applied to one input terminal of a differential amplifier 118. By selecting a reference voltage V1 applied to a reference voltage terminal 120 of the differential amplifier 118, the sensitivity of the photoelectric conversion process can be established.

For example, as shown in FIG. 8, a sensitivity V2 is set for a normal signal light level, whereas a sensitivity V1 is set for a signal light level which is lower than the normal signal light level. With this arrangement, a reduction in the light level due to a dirt deposit on the mating surfaces can reliably be detected.

Figure 9:
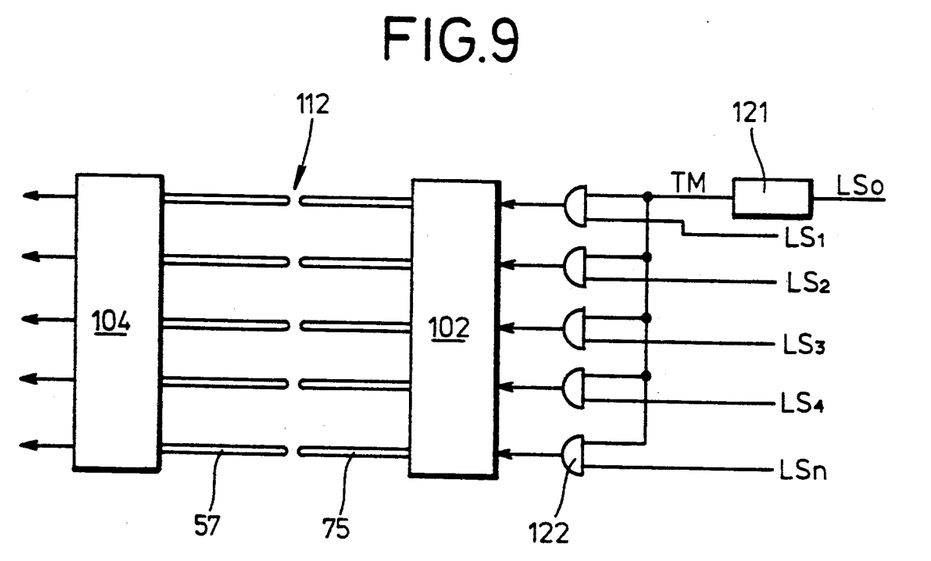
FIG. 9 is a diagram showing another means for detecting dirt on mating surfaces.

FIG. 9 shows another means for detecting dirt on the mating surfaces. In this embodiment, a signal LS0 representing that the robot arm and the robot hand are coupled is applied to a timer circuit 121. In response to an output signal from the timer circuit 121, all of the signals LS1 through LSn indicative of the operating conditions of the parts of the robot hand are rendered high or ON for a preset period of time after the robot arm and the robot hand have been coupled, so that all light-emitting elements in the photoelectric transducer circuit 102 are energized to transmit optical signals from the optical fibers 75 across the mating surfaces 112 into the optical fibers 57. The optical signals are then converted to electric signals by photoelectric transducer elements such as photocouplers in the photoelectric transducer circuit 104.

The sensitivity of each of the photoelectric transducer elements in the photoelectric transducer circuit 104 is set to a sensitivity level V1 as described with reference to FIGS. 7 and 8 for detecting dirt on the mating surfaces in the same manner as in the embodiment of FIGS. 7 and 8.

Figure 10:
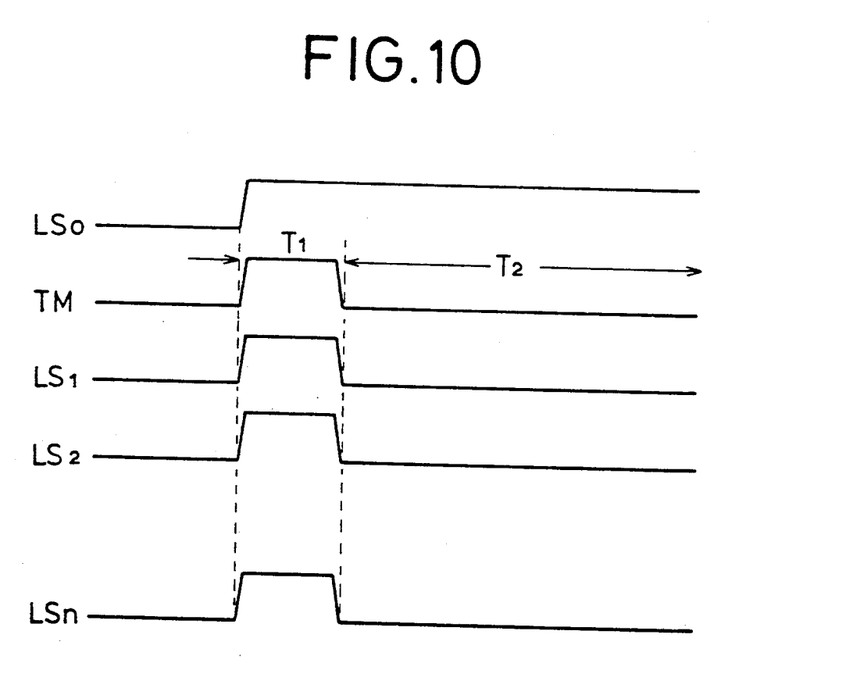
FIG. 10 is a diagram of the waveforms of signals in the arrangement shown in FIG. 9.

FIG. 10 shows signal waveforms indicative of operation of the arrangement of FIG. 9. LS0 represents a condition in which the robot arm and the robot hand are coupled to each other, and TM an output signal from the timer circuit 121. The timer circuit 121 generates an output signal for a certain period of time T1 after the robot arm and the robot hand are coupled to each other. During the period of time T1, the signals LS1 through LSn indicative of the operating conditions of the parts of the robot hand are ON and supplied via AND gates 122 in FIG. 9, after which the signals are converted to optical signals by the light-emitting elements in the photoelectric transducer circuit 102.

With the present invention, as described above, the joint member on the robot body and the joint member on the robot arm are firmly joined to each other by the engaging member which has the tapered surfaces fitted over one of the joint members. Therefore, a robot hand which is relatively large and heavy can reliably be mounted on the robot body. A variety of different robot hands can selectively be mounted easily on the robot body to make the robot body highly versatile or usable in various applications. Since the pipes for supplying the operating medium, the optical fibers, and the lead wires are not exposed, they are protected from damage or breakage to allow robot hands to perform different operations effectively.

Plural pairs of optical signal transmitting means for transmitting control signals across the mating surfaces of the robot hand and the robot arm are mounted in the first and second joint members on the robot arm and the robot hand such that the optical signal transmitting means in each pair face each other out of contact, the robot arm and the robot hand incorporating photoelectric transducer circuits, respectively. Accordingly, no mechanical contact is required when transmitting the control signals, and the robot hand can easily be detached and attached for replacement. Even if the robot hand is replaced highly frequently, the optical signal transmitting means are not damaged, and hence the optical signal transmission device is highly durable and reliable. Since only the optical signal transmitting means are required to be disposed in place, the control signal transmitter may be smaller in size than would be if magnetic coupling were relied upon.

Moreover, one pair of optical fibers is employed at all times or for a prescribed period of time after the robot arm and the robot hand have been coupled to each other, and an optical signal is transmitted through the pair of optical fibers and detected at a predetermined light level for the detection of dirt on the mating surfaces. Such a dirt detection capability increases the reliability of robot operation.

As shown in FIG. 6, the set of optical fibers facing each other out of contact may be replaced with a pair of a light-emitting element such as an LED 200 and a light detector such as a phototransistor 300 which are embedded in the holder plates, and electric circuits may be incorporated in the holder plates for performing the same functions as those described above.

Although certain preferred embodiments have been shown and described, it should be understood that many changes and modifications may be made therein without departing from the scope of the appended claims.

What is claimed is:

1. A robot hand changer comprising:
   a first joint member adapted to be mounted on a robot arm;
   a second joint member adapted to be mounted on a robot hand, said first and second joint members being detachably coupled to connect said robot hand to said robot arm;
   a plurality of optical signal transmitting means mounted in said first and second joint members, each optical signal transmitting means comprising a pair of optical elements in confronting relation out of contact with each other, for transmitting a plurality of control signals across mating surfaces of said robot hand and said robot arm; and
   photoelectric transducer circuits adapted to be disposed in said robot hand and said robot arm, respectively, for converting an optical signal received via said optical signal transmitting means to electric signals and/or converting an optical signal transmitted via said optical signal transmitting means from electric signals.

2. A robot hand changer according to claim 1, wherein said optical signal transmitting means comprise a pair of optical fibers.

3. A robot hand changer according to claim 1, wherein said optical signal transmitting means comprise a light-emitting element and a light detector.

4. A robot hand changer according to claim 1, wherein said optical signal transmitting means transmit the optical signal at all times while said robot arm and said robot hand are being coupled to each other, further including means for detecting a light signal transmitted via said optical signal transmitting means in relation to a predetermined light level to detect dirt on said mating surfaces.

5. A robot hand changer according to claim 1, further including means for detecting a light signal transmitted via said optical signal transmitting means in relation to a predetermined light level to detect dirt on said mating surfaces, for a prescribed interval of time at least after said robot arm and said robot hand are coupled to each other.

6. A robot hand changer comprising:

a first joint member adapted to be mounted on a robot arm;

a second joint member adapted to be mounted on a robot hand, said first and second joint members being coupled to detachably connect said robot hand to said robot arm;

at least one set of optical signal transmitting means mounted in said first and second joint members in confronting relation out of contact with each other for transmitting control signals across mating surfaces of said robot hand and said robot arm; and photoelectric transducer circuits adapted to be disposed in said robot hand and said robot arm, respectively, for converting an optical signal received via said optical signal transmitting means to electric signals and/or converting an optical signal transmitted via said optical signal transmitting means from electric signals;

said optical fibers transmit the optical signal at all times while said robot arm and said robot hand are being coupled to each other, further including means for detecting a light signal transmitted via said optical fibers in relation to a predetermined light level to detect dirt on said mating surfaces.

7. A robot hand changer according to claim 6, wherein said optical signal transmitting means comprise a pair of optical fibers.

8. A robot hand changer according to claim 6, wherein said optical signal transmitting means comprise a light-emitting element and a light detector.

9. A robot hand changer comprising:

a first joint member adapted to be mounted on a robot arm;

a second joint member adapted to be mounted on a robot hand, said first and second joint members being coupled to detachably connect said robot hand to said robot arm;

at least one set of optical signal transmitting means mounted in said first and second joint members in confronting relation out of contact with each other for transmitting control signals across mating surfaces of said robot hand and said robot arm; and photoelectric transducer circuits adapted to be disposed in said robot hand and said robot arm, respectively, for converting an optical signal received via said optical signal transmitting means to electric signals and/or converting an optical signal transmitted via said optical signal transmitting means from electric signals;

said optical fibers transmit the optical signal at all times while said robot arm and said robot hand are being coupled to each other, further including means for detecting a light signal transmitted via said optical fibers in relation to a predetermined light level to detect dirt on said mating surfaces; and detecting means for detecting a light signal transmitted via said optical fibers in relation to a predetermined light level to detect dirt on said mating surfaces, for a prescribed interval of time at least after said robot arm and said robot hand are coupled to each other.

* * * * *